P. E. WOODRUFF
PLOW ATTACHMENT.
APPLICATION FILED APR. 3, 1919.

1,318,251.

Patented Oct. 7, 1919.
2 SHEETS—SHEET 1.

Inventor
P. E. Woodruff,
By G. Hume Talbert
Attorney

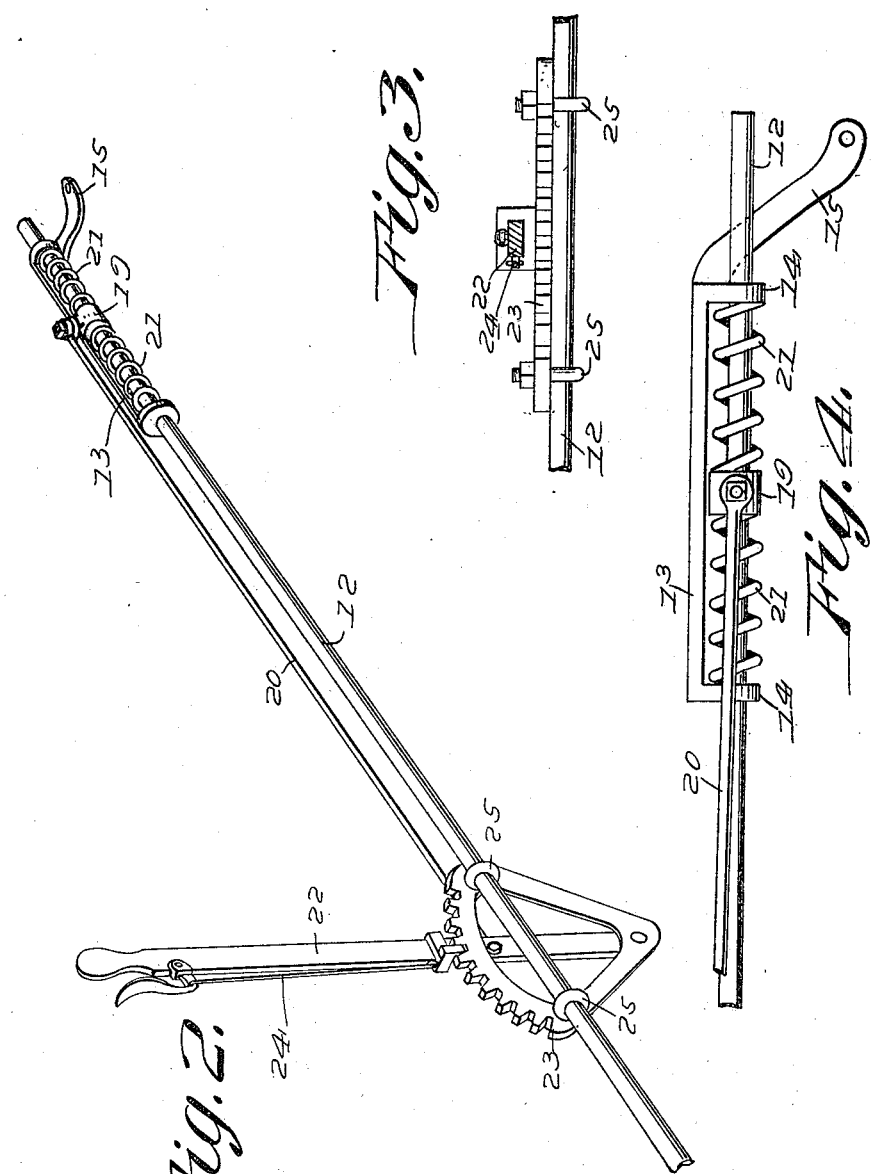

UNITED STATES PATENT OFFICE.

PERCEY E. WOODRUFF, OF FARMINGTON, WASHINGTON.

PLOW ATTACHMENT.

1,318,251.  Specification of Letters Patent.  Patented Oct. 7, 1919.

Application filed April 3, 1919. Serial No. 287,223.

*To all whom it may concern:*

Be it known that I, PERCEY E. WOODRUFF, a citizen of the United States of America, residing at Farmington, in the county of Whitman and State of Washington, have invented new and useful Improvements in Plow Attachments, of which the following is a specification.

The object of the invention is to provide a device for use in conjunction with sulky plows whereby the rear furrow wheel may be shifted to various angular positions to keep the plow so disposed as to throw the furrow uphill or downhill when plowing on the side of a hill, the improved attachment including manually operable means within easy reach of the plowman for shifting the said furrow wheel to the various desired angular positions.

The invention is illustrated and described in a specific embodiment, to which, however, it is not to be restricted. The right is reserved to make such changes or alterations as the actual reduction to practice may suggest, in so far as such changes or alterations are compatible in spirit with the annexed claims.

In the accompanying drawings:

Fig. 2 is a detailed perspective view of the furrow wheel shifting device.

Fig. 3 is a detailed view partly in plan and partly in section of the operating lever, and its attendant rack.

Fig. 4 is a top plan view of that part of the mechanism connected with the rear wheel structure.

Figure 1:
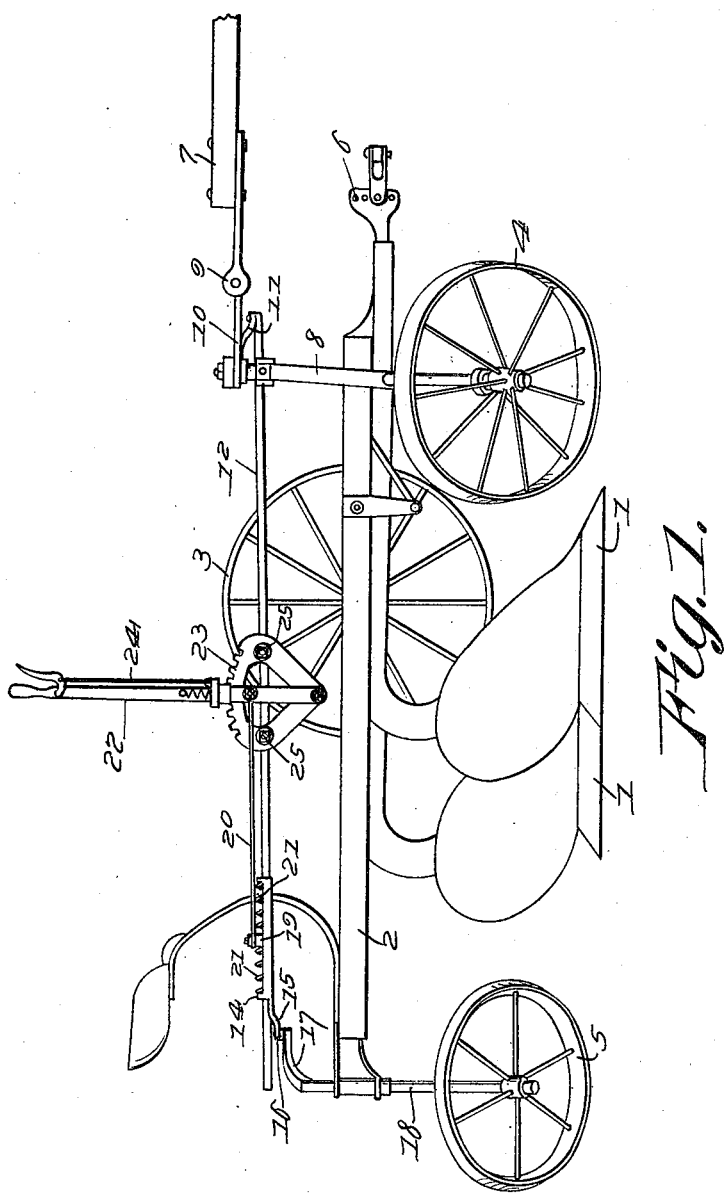
Figure 1 is a view in side elevation of a sulky plow on which the improved attachment is employed.

Referring to the drawings, the invention is shown applied to a gang sulky plow having the ground working elements 1, the beam 2 from which the ground working elements are swung, the landside wheel 3, the forward furrow wheel 4 and the rear furrow wheel 5. All of these parts are of the ordinary well known construction and the plow is designed to be drawn by means attached to the forward end of the beam structure 2—that is, attached at the end indicated at 6.

A tongue 7 is provided by means of which the plow may be turned when its direction of movement is desired, and this tongue pivotally connects with the standard 8 of the upper end thereof, the standard being part of the plow structure. The tongue 7 is mounted to swing in a vertical plane by the pivotal connection indicated at 9, the tongue at this point being connected to the arm 10, which has formed therewith a laterally and forwardly projecting arm 11. The arm 11 at its extremity pivotally connects with a longitudinally extending rod or bar 12 adjacent the rear end of which there is carried a U-shaped member formed with a relatively long web portion 13, and two relatively short legs 14, these legs being formed with eyes by means of which a sliding engagement is effected between the U-shaped member and the rod or bar 12. This U-shaped member is formed with a rearwardly and laterally extending arm 15, which pivotally connects, as indicated at 16, with an arm 17 formed at the upper end of a standard 18 at the lower end of which the rear furrow wheel 5 is rotatably mounted. The standard 18 is mounted for rocking movement at the rear end of the plow beam 2, so that the axis of rotation of the furrow wheel 5 may be changed with reference to the axis of the other wheel.

Loosely mounted upon the bar 12 between legs 14 of the U-shaped member there is a collar 19, to which there is pivotally connected one end of a connecting rod 20. Compression springs 21 are interposed between the legs 14 and the collar so that they stand on opposite sides of the collar, and tend normally to hold the collar evenly spaced between the two legs.

The remaining end of the connecting rod 20 pivotally connects with a hand lever 22, this lever in turn being pivotally connected at the lower end of a toothed sector 23, and having a spring held manually operable latch 24, which engages between any two teeth of the sector to hold the lever in various angular positions with reference to the sector. The sector is designed to be held stationary with reference to the bar 12, and to this end is secured to the latter by means of clamping elements 25.

In the operation of the invention, it is apparent that the turning of the tongue 7 from one side to the other will, by rocking the arm 11, impart longitudinal movement to the bar 12 either in one direction or the other depending on how the tongue 7 is turned. This will obviously carry the sector 23 and its attendant parts and the U-shaped member and its attendant parts either forwardly or rearwardly with the result that the standard 18 of the rear furrow wheel is rocked in its bearings to change the axis of rotation of the rear furrow wheel for the obvious purpose of guiding the machine. In order to keep the ground working elements 1 of the machine in a furrow when plowing on the side of a hill throwing the furrow up the hill, it is necessary to shift the rear furrow wheel 5 so that its axis of rotation will tend to move the rear end of the machine up the hill. This is effected by releasing the latch 24 and shifting the lever 22 backwardly, when the U-shaped member is moved backwardly along the rod 12 and the standard 18 turned to give the rear furrow wheel the desired position. The springs 21 interposed by the collar 19 and the U-shaped member cushion the vibrations imparted to the rear furrow wheel and permit slight rocking of standard 18 without imparting to the plow structure the intermittent shocks that would otherwise result from such vibrations. Moving the lever 22 backwardly will obviously hold the rear of the plow up the hill when throwing the furrow up the hill and it is, therefore, apparent that the movement of the lever 22 forwardly will shift the furrow wheel 5 to such a position as will tend to hold the rear of the plow up the hill when throwing the furrow down the hill.

From the foregoing description and the accompanying drawings, it is believed that a clear enough understanding of the invention is to be had to render further description unnecessary.

The invention having been described, what is claimed as new and useful is:

1. The combination with a sulky plow having a rear furrow wheel mounted to have its axis of rotation shifted angularly with respect to the plow, of a longitudinal rod carried by the plow, a toothed sector mounted on the rod, a lever pivotally mounted on the toothed sector and having locking means engageable therewith, a U-shaped member having its legs slidably engaging the rod and having means pivotally connecting it with the said furrow wheel structure, and connections between said lever and said U-shaped member whereby the latter may be moved longitudinally along the rod, the said connections including cushioning means whereby vibrations of the furrow wheel will not be imparted to the rod and to the plow.

2. The combination with a sulky plow having a rear furrow wheel mounted to have its axis of rotation shifted angularly with respect to the plow, of a longitudinal rod carried by the plow, a toothed sector mounted on the rod, a lever pivotally mounted on the toothed sector, and having locking means engageable therewith, a U-shaped member having its legs slidably engaging the rod and having means pivotally connecting it with the said furrow wheel structure, a collar slidably mounted on the rod, between the legs of the U-shaped member, a rim, springs interposed between the collar and the said legs, and a connecting rod between the said collar and the said lever.

In testimony whereof he affixes his signature.

PERCEY E. WOODRUFF.

Copies of this patent may be obtained for five cents each, by addressing the "Commissioner of Patents, Washington, D. C."